UNITED STATES PATENT OFFICE.

JOHN HANNIBAL STEWART, OF REIDSVILLE, NORTH CAROLINA.

WASHING-FLUID.

SPECIFICATION forming part of Letters Patent No. 410,657, dated September 10, 1889.

Application filed October 4, 1888. Serial No. 287,215. (Specimens.)

*To all whom it may concern:*

Be it known that I, JOHN HANNIBAL STEWART, a citizen of the United States, residing at Reidsville, in the county of Rockingham and State of North Carolina, have invented a new and useful Improvement in Washing Compounds, of which the following is a specification.

The invention is a composition of matter forming a washing compound, the object being to provide such a composition containing gas that will be released and escape when the soap is dissolved in water and which will aid materially in cleaning the clothes.

The said composition of matter is composed of the following ingredients, in the following proportions: strained extract of coffee, one quart; soap, one pound; gum-arabic, one-fourth ounce; saltpeter, one-fourth ounce; soapstone, one-half ounce; borax, one-half ounce; carbonate of ammonia, one-half ounce.

The solid ingredients are powdered before mixing.

The soap is first put in a suitable vessel with the coffee and the mixture boiled and stirred for about fifteen minutes. Then it is removed from the fire, the remaining ingredients stirred in for about one minute, and the mixture is then run into molds of desired or convenient form.

This particular compound holds a gas within its substance, which gas is set free in the boiling water, and will immediately permeate the clothes and loosen and remove the dirt therefrom.

To clean the clothes, they are rubbed with the said compound (only one-fourth part thereof being used as of common soap) and boiled for about twenty or twenty-five minutes. They need then only to be rinsed and will have a good gloss upon them when ironed.

The above-mentioned extract of coffee is prepared by boiling two ounces of ground coffee in one quart of water until the strength of the former is entirely extracted. Then the decoction is strained to remove the grounds. The extract of coffee possesses mild detergent properties, and hence its use in my compound.

Having described my invention, I claim—

The herein-described composition of matter, forming a washing compound, and composed of soap, strained coffee, gum-arabic, saltpeter, soapstone, borax, and carbonate of ammonia, in the proportions specified.

In testimony that I claim the foregoing as my own I have hereto affixed my signature in presence of two witnesses.

JOHN HANNIBAL STEWART.

Witnesses:
 THOMAS CLANCY EVANS,
 GEO. ROBT. QUINCY.